United States Patent [19]
Kovalsky et al.

[11] Patent Number: 5,819,376
[45] Date of Patent: Oct. 13, 1998

[54] HOSE CLAMP

[75] Inventors: Lev S. Kovalsky, Hamilton; Werner Weller, Dundas, both of Canada

[73] Assignee: Barnes Group Inc., Bristol, Conn.

[21] Appl. No.: 997,836

[22] Filed: Dec. 24, 1997

[51] Int. Cl.⁶ .............................. B65D 63/00; F16L 33/02
[52] U.S. Cl. ...................... 24/23 R; 24/20 TT; 24/20 EE; 24/20 R; 24/20 CW
[58] Field of Search ................ 24/19, 20 R, 20 CW, 24/20 TT, 23 EE, 23 R

[56] References Cited

U.S. PATENT DOCUMENTS

| | | | |
|---|---|---|---|
| 4,713,863 | 12/1987 | Jennings | 24/20 EE X |
| 4,773,129 | 9/1988 | Muhr . | |
| 4,890,360 | 1/1990 | Calmettes et al. | 24/20 E X |
| 4,930,192 | 6/1990 | Muhr . | |
| 4,969,240 | 11/1990 | Sauer . | |
| 4,996,749 | 3/1991 | Takahashi | 24/20 CW X |
| 5,185,907 | 2/1993 | Kawashima . | |
| 5,203,809 | 4/1993 | Oetiker . | |
| 5,414,905 | 5/1995 | Kimura et al. | 24/20 R |
| 5,459,906 | 10/1995 | Detable et al. | 24/20 TT X |
| 5,542,155 | 8/1996 | Kimura et al. | 24/20 TT X |
| 5,596,790 | 1/1997 | Möller . | |

FOREIGN PATENT DOCUMENTS

3041-106  5/1982  Germany .

*Primary Examiner*—Randolph A. Reese
*Assistant Examiner*—Robert J. Sandy
*Attorney, Agent, or Firm*—Vickers, Daniels & Young

[57] ABSTRACT

A hose clamp comprises a circular clamp body of resilient material having an axis, a central portion and circumferentially overlapping opposite ends having axially adjacent inner edges. The body is circumferentially spreadable against the resiliency of said material from an unexpanded to an expanded condition in which a keeper on one of the ends circumferentially interengages with a catch on the other end to releasably hold said body in said expanded condition. The opposite ends of the body are displaceable relative to one another to disengage the keeper and catch to release the body for return to the unexpanded condition, and the central portion is provided with openings which, in combination with the structure of the ends, provide uniformity of clamping force around the circumference of the clamp.

36 Claims, 7 Drawing Sheets

HOSE CLAMP

BACKGROUND OF THE INVENTION

This invention relates to the art of hose clamps and, more particularly, to an improved structure for obtaining uniformity of force about the circumference of a clamp and improved arrangements for releasably holding a hose clamp in an expanded or spread condition against the inherent resiliency of the clamp material.

Hose clamps of the general type to which the present invention is directed are well known and comprise a body of resilient material such as spring steel having circumferentially opposite ends which are circumferentially overlapped by providing one of the ends with an elongated slot between the axially opposite side edges thereof and through which an axially narrow strip at the other end extends. Such clamps are disclosed, for example, in U.S. Pat. Nos. 4,773,129 to Muhr; 4,930,192 to Muhr; 4,969,240 to Sauer; 5,185,907 to Kawashima, et al.; 5,203,809 to Oetiker; and 5,596,790 to Moller, the disclosures of which are incorporated herein by reference for background purposes. As is well known and disclosed in the foregoing patents, the opposite ends of the body are provided with outwardly extending tab arrangements by which the clamp is circumferentially spreadable from an initial unexpanded condition to an expanded condition in which the clamp is adapted to readily receive a hose to be clamped thereby. As is further well known and shown in the foregoing patents, arrangements are provided for releasably interengaging the ends of the clamp in the expanded condition whereby, when the clamp is positioned on the hose, the ends of the clamp can be manipulated through the use of an appropriate tool to release the ends for return toward the unexpanded condition in which the clamp tightly engages the hose.

A number of problems are attendant to the manufacturing and functional operation of hose clamps of the foregoing character in which the clamp ends are structured as described above. In this respect, the opposite ends of the clamp are bent to extend outwardly therefrom to provide tabs which can be grasped by pliers or the like to spread the clamp to its expanded condition. These tabs, or one of the tabs and a portion of the other end of the clamp, are structured for releasable interengagement when the clamp is in its expanded condition. The arrangements for releasably interengaging the ends of the clamp are often structurally complex, and the tooling for cutting the blank from which the clamp is formed is expensive as is the tooling for forming the cut blank into the circular configuration. Particularly in this respect, the tooling must provide for appropriately aligning and controlling the positions of the tabs and/or interengaging components as the ends of the blank are moved into circumferentially overlapping relationship with one end extending through the opening in the other.

A major problem resides in the fact that the elongate slot and narrow end strip structure of the clamps heretofore available preclude obtaining uniformity of clamping force about the circumference of the clamp and, additionally, create areas of weakness in which the spring material is apt to yield if over expanded. Accordingly, many such clamps, including those in the above patents to Muhr, Sauer and Moller, refer to or specifically provide special stop arrangements to limit expansion of the clamps. This disadvantageously adds to the expense of making the clamps, and the area of weakness and the potential for yield of the clamp material upon expansion is an undesirable characteristic. Moreover, the non-uniformity of the clamping force about the circumference of the clamp is detrimental to achieving a good seal between the hose and a pipe or tube therein and about which the hose is clamped.

Moreover, the tab structure and interengagement between the opposite ends of the clamp often makes it difficult for the user to find circumferentially opposite tab surfaces which are aligned sufficiently to facilitate engagement thereof between the jaws of pliers or the like to spread the clamp without the tool slipping from engagement therewith. Furthermore, the arrangements for releasably interengaging the ends of the clamp in the expanded condition are often limited with respect to the manner in which the ends can be released and, in many instances, the releasing operation is inconvenient. With respect to the limited manner in which release of the ends of the clamp can be achieved, the interengaging structures are often such that disengagement can be achieved only by the interposition and manipulation of a tool such as a screwdriver in a single direction relative to the clamp. Such a limitation can make the releasing operation difficult depending on the location of the hose and the clamp thereon and the space available for a worker to access the clamp for the releasing operation.

Overall, the clamping structures heretofore available are undesirably complex and thus undesirably expensive to manufacture and, in use, are difficult and/or inconvenient to manipulate with respect to both spreading the clamp to its expanded condition and releasing the clamp for return to its unexpanded condition. More importantly, they are potentially subject to failure as a result of yielding of the clamp material and are inefficient in use in that they do not provide a uniform clamping force about the circumference thereof.

SUMMARY OF THE INVENTION

In accordance with the present invention, a hose clamp is provided by which the foregoing and other problems and disadvantages of hose clamps heretofore available are minimized and/or avoided. More particularly in accordance with the present invention, a hose clamp is constructed from a blank of resilient material such as spring steel to have a central portion and opposite ends which are basically mirror images of each other when the blank is formed to the circular contour of the clamp. More particularly in this respect, the ends of the clamp extend in longitudinally opposite directions from the central portion and are laterally offset relative to one another whereby, when the blank is shaped to its circular contour, the ends are in circumferentially overlapping and laterally or axially adjacent relationship. The ends are identical in circumferential length and lateral width and contour and this, together with openings through the central portion which are between the ends thereof and symmetrical with respect to both the midpoint of the central portion and a centerline in the direction between the opposite ends, provides uniformity of force for the clamp about the circumference thereof.

Catch and keeper elements are provided on the opposite ends for releasably interengaging with one another to hold the clamp in its spread or circumferentially expanded condition, and the structure and structural interrelationship between the catch and keeper components advantageously provide for the latter to form a stop and locking mechanism for achieving expansion of the clamp to its open condition without any risk of yield of the clamp material and without any special stops to preclude over expansion. Preferably, the opposite ends of the clamp are provided with tabs by which the clamp can be spread to its expanded condition and, advantageously, the end structure enables the foregoing release capability while at the same time providing a circumferential alignment of the tabs of the clamp relative to one another which facilitates engaging the tabs with a tool such as a pair of pliers for spreading the clamp to its expanded condition. In accordance with another aspect of the invention, the structural relationship between the ends of the clamp provides for the tab, catch and keeper components to be structured and structurally interrelated such that relative displacement between the ends to release the clamp from its expanded condition can be achieved by any one of a plurality of selectable tool manipulations relative to the clamp components. Accordingly, improved versatility is provided with respect to releasing the clamp ends, and this versatility facilitates access to the clamp for release with less concern than heretofore with respect to the location or position of the clamp relative to the user.

The structure of the clamp provides for the latter to be produced from a clamp blank having a contour which enables production of the blank using tooling which is structurally simple and economical in comparison with that heretofore required. Moreover, the clamp structure advantageously enables the blank to be formed to the circular contour of the clamp without requiring structurally complex and expensive bending dyes and the like as is necessary in connection with the forming of clamp ends which necessitate alignment and movement of one end through an opening in the other end.

It is accordingly an outstanding object of the present invention to provide an improved hose clamp of the character which is adapted to be spread from an unexpanded to an expanded condition and releasably held in the expanded condition by interengaging catch and keeper components on the ends of the clamp.

Another object is the provision of a hose clamp of the foregoing character which provides uniformity of clamping force about the circumference thereof.

Still another object is the provision of a hose clamp of the foregoing character wherein the opposite ends of the clamp are in laterally adjacent and circumferentially overlapping relationship with respect to one another.

A further object is the provision of a hose clamp of the foregoing character which is readily spreadable circumferentially to move the catch and keeper components into snap-locking interengagement to releasably hold the clamp in its expanded condition.

Another object is the provision of a hose clamp of the foregoing character wherein the catch and keeper components are structured and structurally interrelated to provide a stop and lock arrangement by which the clamp can be spread to its expanded condition without any risk of yield of the clamp material due to over expansion and without any specially designed or additional stop elements.

Yet another object is the provision of a hose clamp of the foregoing character in which displacement of the catch and keeper components to disengaged positions to release the clamp for return to its unexpanded condition can be achieved in a plurality of different ways.

Still a further object is the provision of a hose clamp of the foregoing character which is easy to manipulate from the unexpanded to the expanded condition and has structurally simple circumferentially interengaging catch and keeper components for releasably holding the clamp in the expanded condition.

Another object is the provision of a hose clamp of the foregoing character which is more versatile with respect to locating and/or orienting the clamp in a position of use while affording access to the ends of the clamp and providing for releasing the catch and keeper components through one of a plurality of different manipulations thereof relative to one another.

Still another object is the provision of a hose clamp of the foregoing character which is structurally simple and produced from a blank which is economical to cut and form into the clamp configuration.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
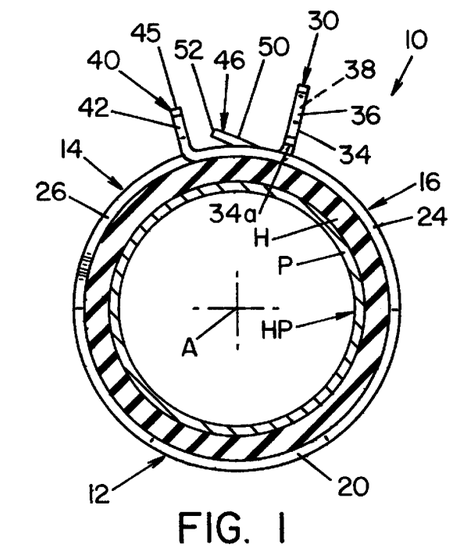
FIG. 1 is an end elevation view of a hose clamp in accordance with the present invention in its unexpanded condition about a hose and pipe assembly.
Figure 2:
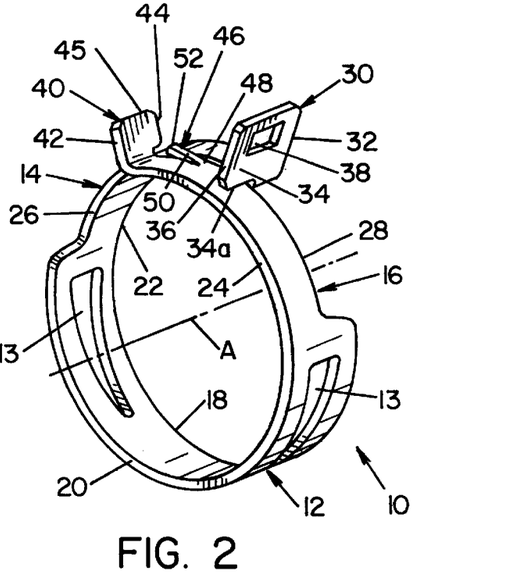
FIG. 2 is a perspective view of the hose clamp alone in its unexpanded condition.
Figure 3:
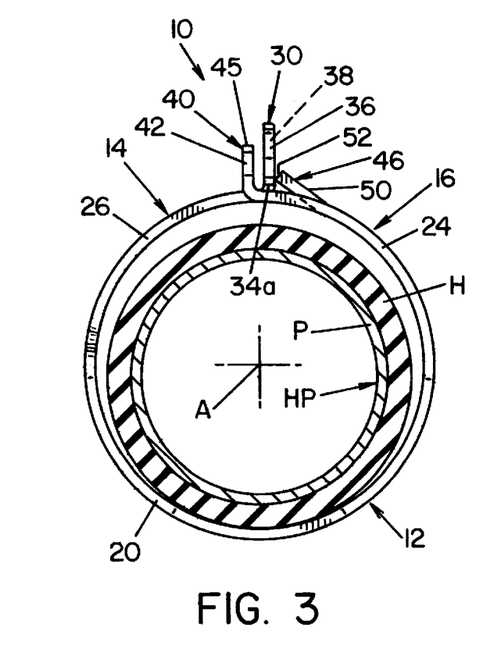
FIG. 3 is an end elevation view of the hose clamp in its expanded condition relative to the hose and pipe assembly.
Figure 4:
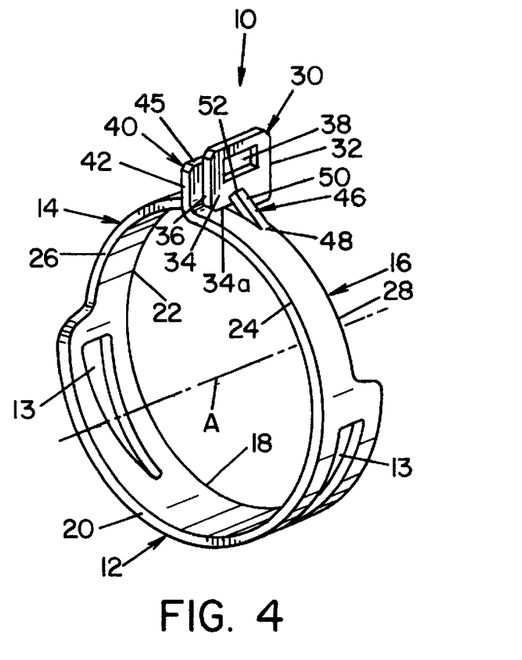
FIG. 4 is a perspective view of the hose clamp alone in its expanded condition.
Figure 5:
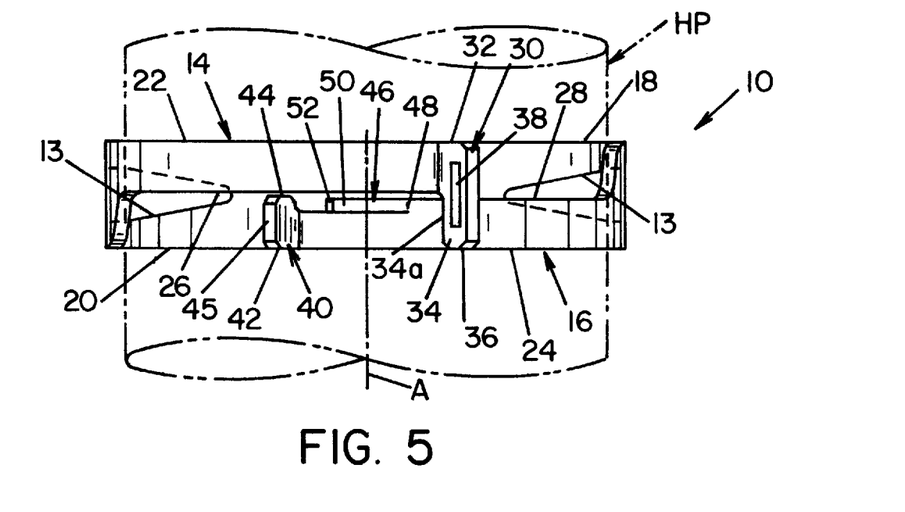
FIG. 5 is a plan view of the hose clamp shown in FIG. 1.
Figure 6:
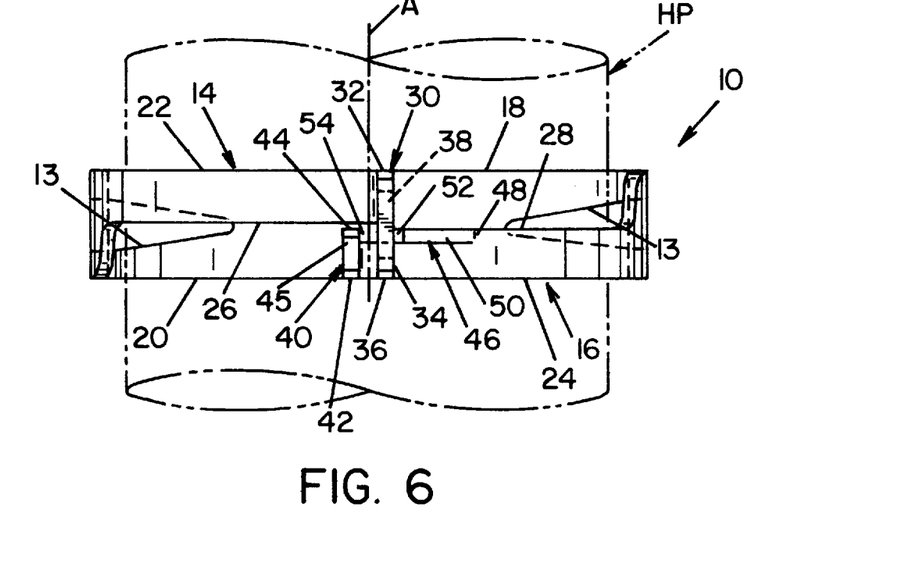
FIG. 6 is a plan view of the hose clamp shown in FIG. 3.

Referring now in greater detail to the drawings, wherein the showings are for the purpose of illustrating preferred embodiments of the invention only and not for the purpose of limiting the invention, FIGS. 1–6 illustrate a first embodiment of a hose clamp 10 in conjunction with a hose and pipe assembly HP comprising a hose H surrounding a pipe P. Hose clamp 10 extends about assembly HP either in an unexpanded condition as shown in FIGS. 1 and 5 or an expanded condition as shown in FIGS. 3 and 6 and in which positions the hose clamp respectively clampingly engages hose H about pipe P and is released from such engagement for axial displacement relative to the hose and pipe assembly. As will become apparent hereinafter, the opposite ends of hose clamp 10 are provided with interengaging stop and catch components by which the clamp is releasably held in the expanded condition shown in FIGS. 3, 4 and 6.

In the embodiment illustrated in FIGS. 1–6, hose clamp 10 comprises a circular clamp body having an axis A and comprising a central portion 12 and opposite ends 14 and 16 extending in circumferentially opposite directions therefrom. Central portion 12 is provided with a pair of triangular openings 13, the bases of which are adjacent the junctures of ends 14 and 16 with the central portion and the apexes of which extend toward one another and are circumferentially spaced apart and on opposite sides of the circumferential midpoint of the central portion. Openings 13 are of identical size and contour and are symmetrical with respect to the midpoint of central portion 12 and with respect to a centerline thereof extending in the direction between the opposite ends.

Ends 14 and 16 extend into circumferentially overlapping relationship relative to one another, are of the same width laterally and are in laterally offset relationship relative to central portion 12, whereby the circumferentially overlapping portions of the ends are in axially or laterally adjacent relationship relative to one another. More particularly in this respect, central portion 12 includes axially or laterally opposite side edges 18 and 20, end 14 includes a laterally outer edge 22 which is circumferentially continuous with edge 18, and end 16 includes an axially outer edge 24 which is continuous with edge 20 of central portion 12. Further, end 14 includes an axially inner edge 26 and end 18 includes an axially inner edge 28, which inner edges are in circumferentially overlapping and axially adjacent relationship when the clamp is in its unexpanded and expanded conditions, as respectively shown in FIGS. 5 and 6.

The terminus of end 14 is in the form of a tab 30 extending radially outwardly of the clamp body and, preferably, having an axially outer edge 32 continuous with edge 22 of end 14 and an axially inner end 34 radially outwardly overlying end 16 and having an edge 36 coplanar with axially outer edge 24 of end 16. Tab 30 is provided with an opening 38 circumferentially therethrough for the purpose set forth hereinafter. The terminus of end 16 is in the form of a tab 40 extending radially outwardly of the clamp body and having an axially outer edge 42 which is continuous with outer edge 24 of end 16. While tab 40 could have an axially inner end radially outwardly overlying end 14 in a manner similar to that of end 34 of tab 30, tab 40 preferably is of an axial width no greater than that of end 16 between edges 24 and 28 and has an axially inner edge 44 coplanar with edge 28 of end 16 and a radially outer end 45.

End 16 of the clamp body is provided with a catch in the form of a finger 46 struck from the material of the clamp body and extending tangentially therefrom. Finger 46 has an end 48 integral therewith, an outer cam surface 50 generally tangent to the outer surface of end 16 and extending toward tab 40 and a catch surface 52 at the distal end thereof which is facially offset from end 16 and circumferentially spaced from and facing tab 40. Finger 46 has a laterally outer side, not designated numerically, in a plane transverse to axis A and coinciding with edge 28 of end 16, and a laterally inner side parallel to edge 28. As will be appreciated from FIGS. 1–3, end 34 of tab 30 includes a radially inner edge 34a spaced radially outwardly of the outer surface of end 16 a distance less than the spacing of catch surface 52 from the outer surface of end 16, whereby the circumferential displacement of tabs 30 and 40 toward one another from the positions shown in FIGS. 1 and 2 to the positions shown in FIGS. 3 and 4 results in camming interengagement between outer surface 50 of finger 46 and inner edge 34a of tab end 34. It will also be appreciated that the resiliency of the material of the clamp body permits relative radial displacement between ends 14 and 16, whereby spreading of the clamp body through displacement of tabs 30 and 40 toward one another results in catch surface 52 moving past edge 34a of tab end 34 and then radially outwardly of edge 34a to engage behind end 34 of tab 30. Accordingly, it will be appreciated that tab 30 provides a keeper interengaging with catch 46 to hold the hose clamp body in the expanded condition shown in FIGS. 3, 4 and 6 of the drawing.

Figure 7:
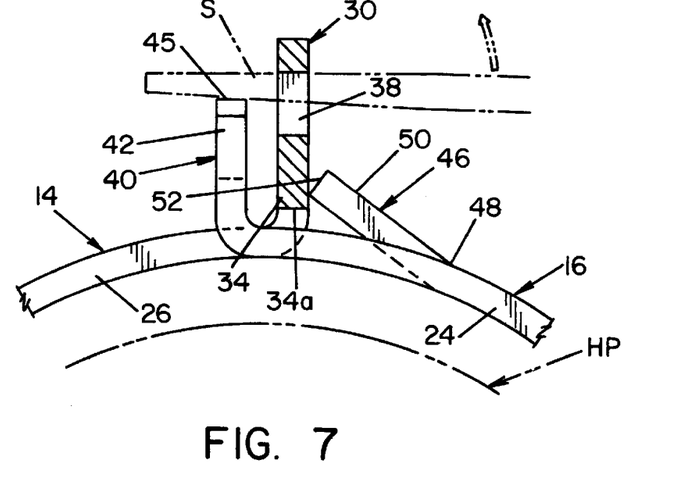
FIG. 7 is an enlarged end elevation view, partially in section, of the interengaged clamp ends and schematically depicting a tool orientation for displacing the ends axially to disengage the stop and catch components.
Figure 8:
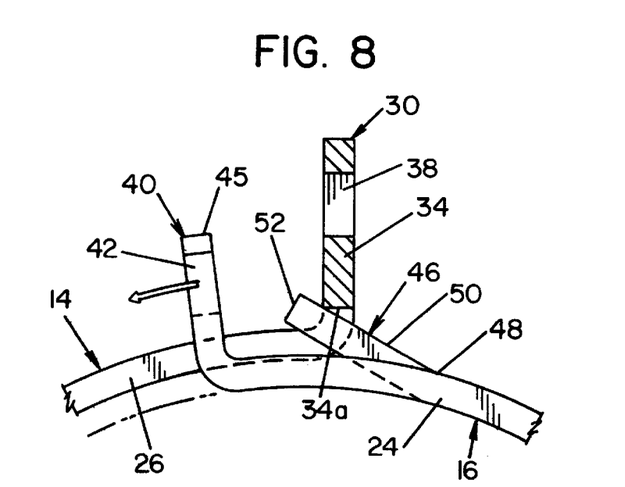
FIG. 8 is an enlarged end elevation view of the clamp ends, partially in section, and showing the positions of the stop and catch components upon disengagement.
Figure 9:
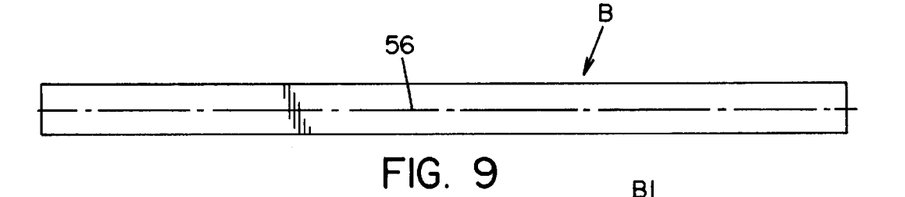
FIGS. 9–13 illustrate the sequence of steps in forming the hose clamp from a flat blank to the expanded condition thereof shown in FIGS. 3 and 4.

As will be appreciated from FIGS. 6–8 of the drawing, catch surface 52 of catch 46 is circumferentially spaced from tab 40 and, when the clamp is in its expanded condition as shown in FIGS. 6 and 7, opening 38 is adapted to receive the end of a screwdriver or other appropriate tool S. As will be appreciated from FIG. 7, when tool S is inserted through opening 38 from the right to the left as shown therein, the outer end of the tool is adapted to be lifted radially outwardly for the tool to engage against outer end 45 of tab 40 and the upper edge of opening 38 so as to displace the ends and thus the catch and keeper components 46 and 30 away from one another in a radial direction of disengagement therebetween. When disengaged, the resiliency of the spring material displaces end 16 counterclockwise as shown in FIG. 8 to return the ends to the unexpanded condition of the clamp shown in FIGS. 1 and 2. As will be appreciated from FIG. 7, tool S can also be inserted through opening 38 from right to left, whereby radial disengagement between the catch and keeper components is achieved by pushing the outer end of the tool radially inwardly of the clamp.

While the clamp is preferably released in the foregoing manner, it will be appreciated from FIGS. 6 and 7 of the drawing that opening 38 is adapted to receive the end of tool S between the side edge of the opening and edge 44 of tab 40, and that the tool can be pivoted axially relative to tabs 30 and 40 to displace the tabs axially relative to one another to move catch and keeper components 46 and 30 out of engagement. As another alternative, tool S can be inserted radially into a space 54 between edges 26 and 44 and rotated to axially displace tabs 30 and 40 out of engagement with one another. Accordingly, it will be appreciated that the hose clamp can be selectively manipulated to release the interengagement between the catch and keeper components when the clamp is in its expanded condition.

As will be further appreciated from FIGS. 5 and 6 of the drawing, tab 40 and end 34 of tab 30 are axially positioned to be circumferentially aligned so as to facilitate engaging the tabs such as by a pair of pliers so as to displace the tabs towards one another to spread the clamp from the unexpanded to the expanded condition thereof. In particular in this respect, the circumferential alignment facilitates such spreading without forces being imposed on the ends of the clamp which tend to twist the latter transverse to the axis thereof causing the clamp ends to slip from between the tool jaws.

Figure 10:
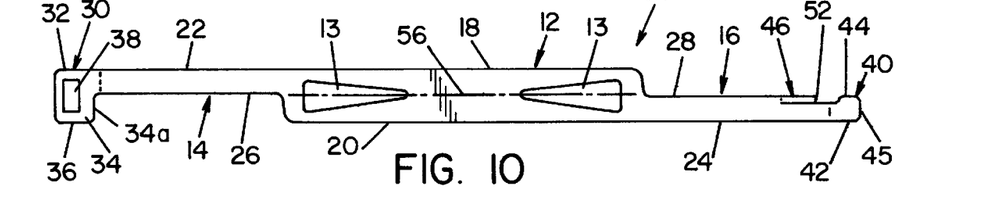
Figure 11:
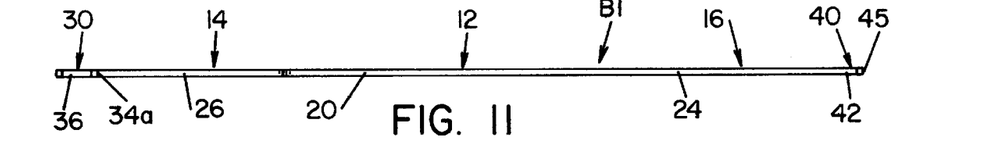
Figure 12:
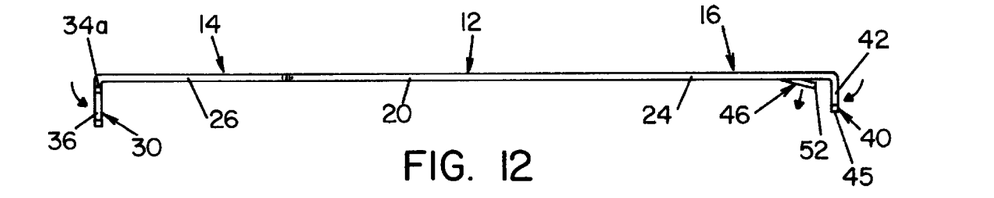
Figure 13:
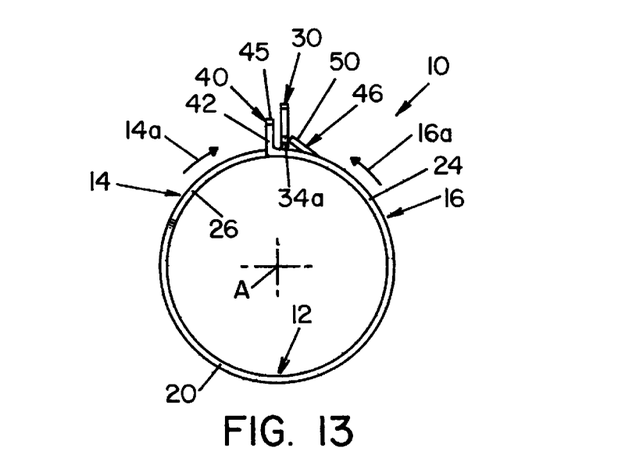
Figure 14:
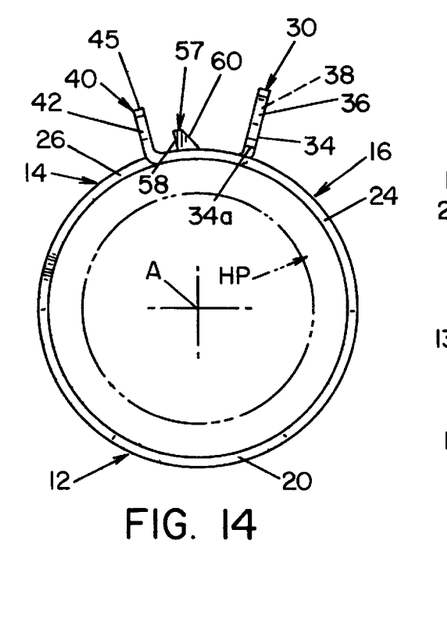
FIG. 14 is an end elevation view of another embodiment of hose clamp in accordance with the invention shown in its unexpanded condition.
Figure 15:
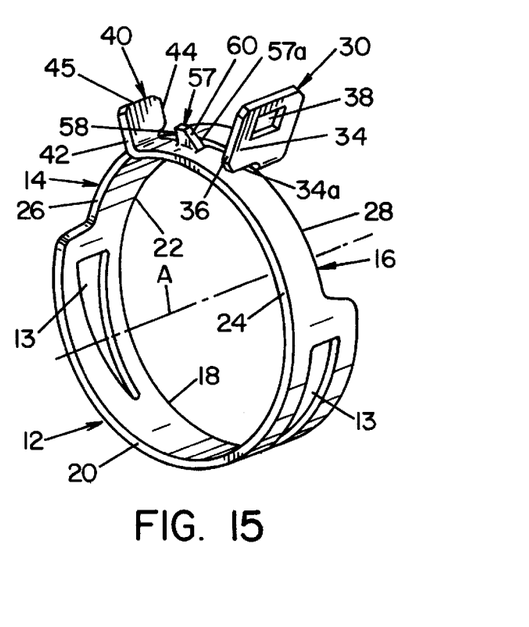
FIG. 15 is a perspective view of the hose clamp alone shown in FIG. 14.

As will be appreciated from FIGS. 9–13, clamp 10 is produced from an elongate blank B of resilient material, such as spring steel, having longitudinally opposite ends relative to a center line or axis 56 and laterally opposite sides extending parallel to one another between the opposite ends of the blank. As shown in FIG. 10, blank B is cut such as by stamping to produce a cut blank B1 providing center portion 12, triangular openings 13, ends 14 and 16, tabs 30 and 40, catch 46, and opening 38 in tab 30. The cut blank is still flat at this point in the process, as shown in FIG. 13, and tabs 30 and 40 are bent at right angles and catch 46 is bent so as to be at an incline to end 16 in the next stage of the operation, as shown in FIG. 14. The blank thus cut and bent is then formed to a circular configuration by displacing ends 14 and 16 upwardly from the positions shown in FIG. 14 and relative to central portion 12 of the clamp body in the direction of arrows 14a and 16a, respectively, in FIG. 15. It will be appreciated that ends 14 and 16 are moved in the latter directions into circumferentially overlapping and axially adjacent relationship to one another to the extent necessary to form the clamp body in its unexpanded condition as shown in FIG. 2. When the clamp is thus formed and the ends are spread to displace the clamp to the expanded condition shown in FIG. 15, the resiliency of the spring material biases the ends in the direction of arrows 14a and 16a and thus toward the unexpanded condition of the clamp. As will be further appreciated from the description herein, the preferred narrow axial width of tab 40 enables the forming of the body into the circular contour thereof with minimum axial or lateral displacement of end 16 to bypass tab 30 during the forming operation. This, together with eliminating the necessity for aligning an end such as end 16 with an opening in the opposite end of the clamp body and moving the one end through the opening, enables achieving the bending with tooling which is structurally simple and thus economical to provide. Likewise, the bending process is made simple and thus economic to achieve. Most importantly, the size of openings 13 together with the widths of ends 14 and 16 provide for the clamp to have a uniform clamping force about the circumference thereof when the clamp is applied about a hose and released from its expanded condition.

Figure 16:
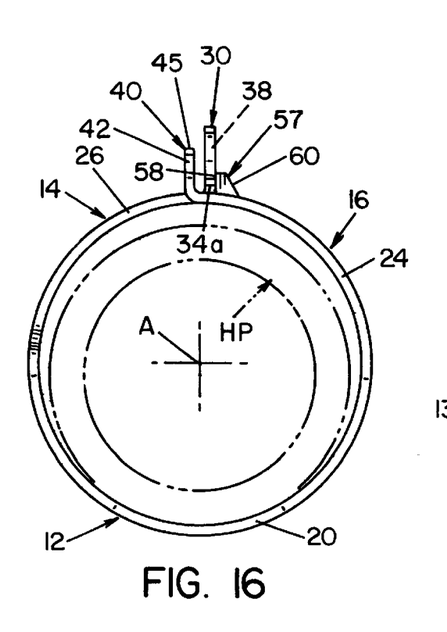
FIG. 16 is an end elevation view of the hose clamp in FIG. 14 shown in its expanded condition.
Figure 17:
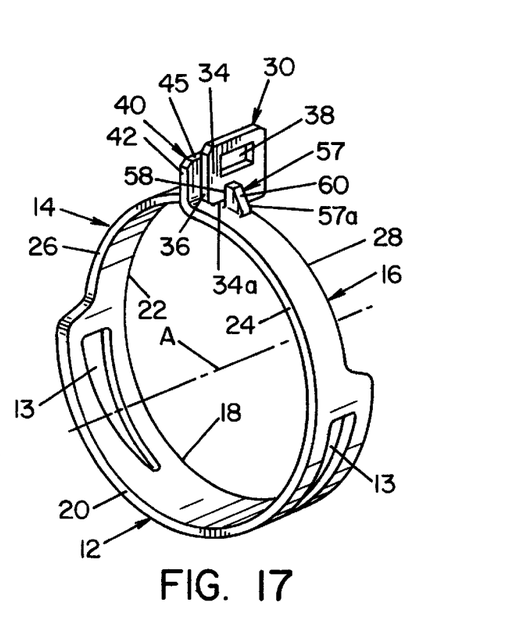
FIG. 17 is a perspective view of the hose clamp alone shown in FIG. 16.
Figure 18:
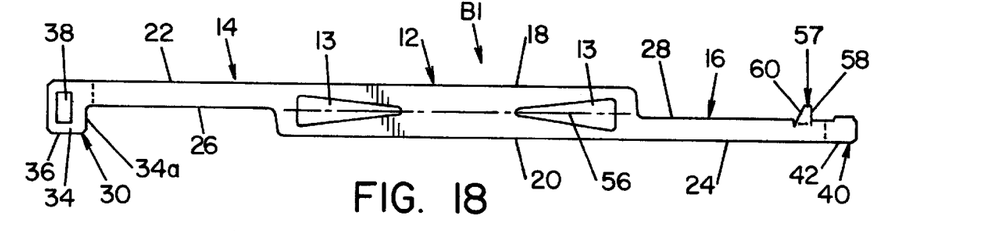
FIG. 18 is a plan view of the cut blank for forming the hose clamp show in FIGS. 14–17.
Figure 19:
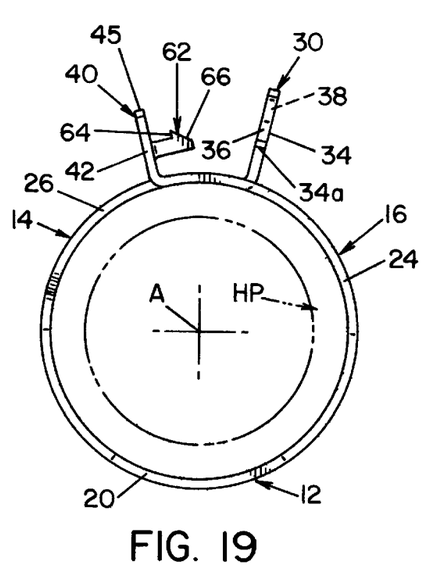
FIG. 19 is an end elevation view of yet another embodiment of hose clamp in accordance with the present invention shown in its unexpanded condition.
Figure 20:
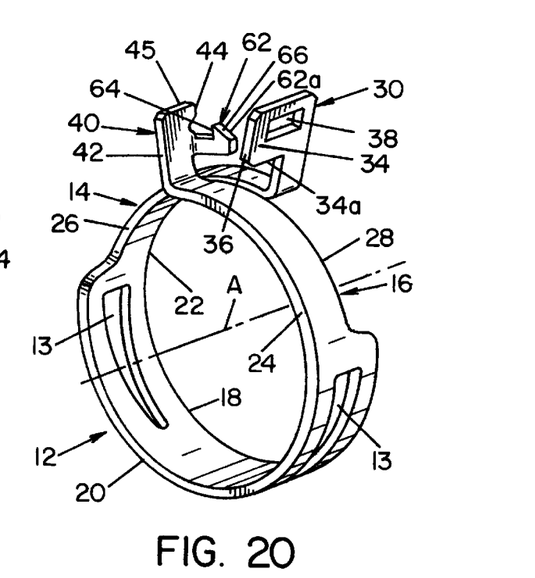
FIG. 20 is a perspective view of the hose clamp alone shown in FIG. 19.
Figure 21:
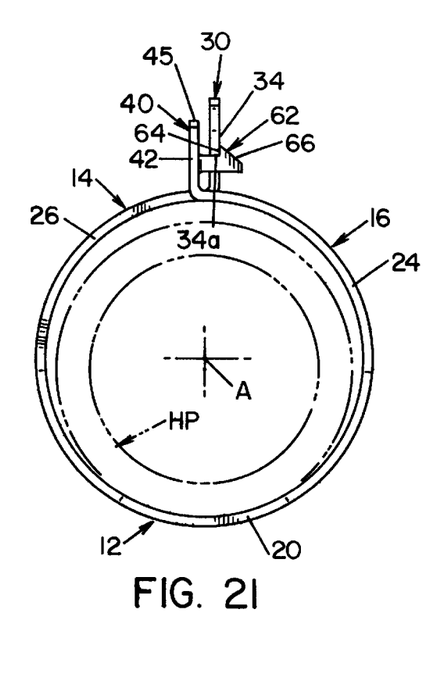
FIG. 21 is an end elevation view of the hose clamp shown in FIG. 19, in its expanded condition.
Figure 22:
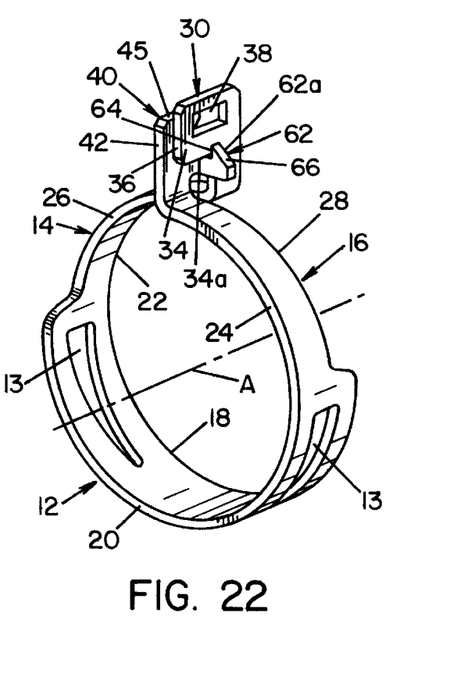
FIG. 22 is a perspective view of the hose clamp alone shown n FIG. 21.
Figure 23:
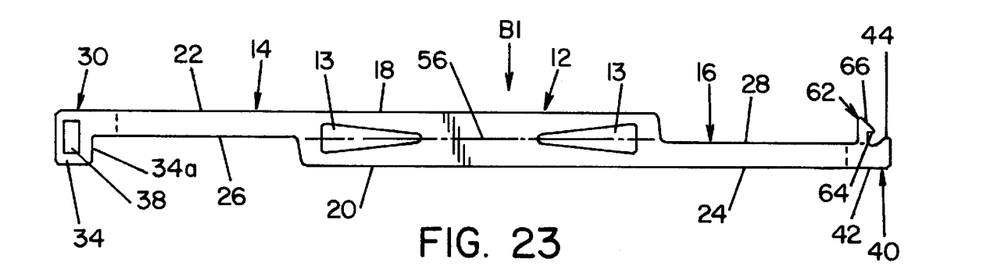
FIG. 23 is a plan view of the blank for forming the hose clamp in FIGS. 19–22.

FIGS. 14–18 illustrate another embodiment of a hose clamp in accordance with the present invention and wherein component parts corresponding to those described hereinabove in connection with FIGS. 1–13 are designated by like numerals. In this embodiment, the catch is in the form of a finger 56 struck from the material of end 16 to extend radially upwardly from the outer surface thereof. Finger 56 has an axially outer side 56a in a plane transverse to axis A and coinciding with axially inner side edge 28 of the end. Finger 56 further has a radially extending catch surface 58 circumferentially spaced from and facing the corresponding side of tab 40, and a camming surface 60 facing away from catch surface 58 and toward tab 30. Accordingly, when the hose clamp is in its unexpanded condition as shown in FIG. 14, tabs 30 and 40 can be circumferentially displaced toward one another by an appropriate tool to move cam surface 60 into engagement with inner edge 34a of tab 30. Thereupon, in the manner described hereinabove with regard to the embodiment of FIGS. 1–6, the clamp ends and thus tabs 30 and 40 are displaced radially relative to one another in the direction to enable the catch to move circumferentially past edge 34a of tab 30 and, thence, radially in the opposite direction for catch surface 58 to facially engage the outer side of tab 30 above edge 34a to releasably hold the clamp in the expanded condition thereof as shown in FIG. 16 of the drawing. As will be appreciated from FIG. 18, the cut blank B1 for this embodiment of the hose clamp is structurally simple and the clamp is readily formed by bending tabs 30 and 40 in the manner described hereinabove in connection with FIG. 12, bending catch finger 56 to extend at right angles to end 16 in the same direction as tab 40, and then forming the cut and bent blank to the circular configuration for the hose clamp in the manner described in connection with FIG. 13. As will be appreciated from the description hereinabove regarding the release of the catch and keeper components in the embodiment of FIGS. 1–6, a tool such as screwdriver can be introduced through opening 38 in tab 30 and displaced either radially inwardly or outwardly against the radially outer end of tab 40 to radially separate the catch and stop components.

FIGS. 19–23 illustrate a further embodiment of a hose clamp in accordance with the present invention and wherein like numerals are used to identify component parts corresponding to those of the embodiment illustrated in FIGS. 1–6 of the drawing. In this embodiment, the catch is in the form of a finger 62 on axially inner edge 44 of tab 40 and which is radially outwardly spaced from the outer surface of end 16 and circumferentially directed toward tab 30. Finger 62 has an axially outer side 62a in a plane transverse to axis A and coinciding with edge 28 of end 16. Further, the finger has a catch surface 64 circumferentially spaced from and facing tab 40 and a camming surface 66 facing away from surface 64 and extending from the radially outer end thereof toward tab 30 at an incline toward the outer surface of end 16. Accordingly, it will be appreciated that when tabs 30 and 40 are displaced toward one another to spread the hose clamp to its expanded condition, camming surface 66 engages radially inner edge 34a of end 34 of tab 30, whereupon the tabs are radially displaced relative to one another in the direction for finger 62 to circumferentially pass edge 34a, and then in the opposite direction for catch surface 64 to engage against the outer side of tab 30 above edge 34a. Again, as will be appreciated from FIG. 23, the cut blank B1 from which this embodiment of the hose clamp is formed is structurally simple, and the clamp is easily and efficiently formed to the desired circular configuration therefor by the simple bending and forming operations described hereinabove in connection with the earlier embodiments. Likewise, as will be appreciated from the earlier embodiments, release of the interengaged ends of the hose clamp for displacement from the expanded to the unexpanded condition is preferably achieved by inserting a tool such as a screwdriver circumferentially through opening 38 in tab 30 and levering the tool against the radially outer end of tab 40 to radially disengage the catch and keeper components.

While considerable emphasis has been placed herein on the structures and structural interrelationships between the component parts of the preferred embodiments of the invention, it will be appreciated that other embodiments can be made and that many changes can be made in the embodiments disclosed herein without departing from the principles of the present invention. In particular in this respect, it will be appreciated that other arrangements for releasably interengaging the clamp ends for relative displacement therebetween can be devised as can other structural arrangements providing interengaging catch and keeper components on the ends of the clamp. In this respect, for example, the keeper could be provided by a component on end 14 of the clamp circumferentially spaced from tab 30 and having an edge and surface overlying end 16 for cooperative interengagement with a catch component thereon. In particular it will be appreciated that ends 14 and 16 can be tapered rather than of the rectangular configuration shown, and that the size and shape of openings 13 can be varied. It is only important in connection with this aspect of the invention that the openings 13 and ends 14 and 16 in combination provide the desired uniformity of force circumferentially about the clamp. These and other modifications as well as other embodiments of the invention will be obvious and suggested to those skilled in the art upon reading the foregoing disclosure, whereby it will be distinctly understood that the foregoing descriptive matter is to be interpreted merely as illustrative of the invention and not as a limitation.

It is claimed:

1. A hose clamp comprising a circular clamp body of resilient material having an axis, a central portion, and axially adjacent circumferentially overlapping opposite ends, said central portion having openings therethrough symmetrical with respect to a midpoint thereof and with respect to a centerline in the direction between said ends, said ends being on laterally opposite sides of said centerline with respect to one another and extending in circumferentially opposite directions from said central portion, said ends having laterally inner edges adjacent said centerline, said body having an unexpanded condition and being spreadable against the resiliency of said material to an expanded condition, one of said ends having a keeper thereon, the other of said ends having a catch thereon, said keeper and said catch circumferentially interengaging in said expanded condition of said body to releasably hold said body in said expanded condition, and said opposite ends of said body being displaceable relative to one another to disengage said keeper and said catch to release said body.

2. A hose clamp according to claim 1, wherein said central portion has axially opposite edges and each of said opposite ends has an axially outer edge coinciding with a different one of said opposite edges of said central portion.

3. A hose clamp according to claim 1, wherein said keeper includes a tab on said one end extending radially outwardly of said body, and said catch includes a finger on said other end having a catch surface for circumferentially engaging said tab.

4. A hose clamp according to claim 3, wherein said finger extends tangential to said clamp body and has an outer end providing said catch surface.

5. A hose clamp according to claim 3, wherein said finger extends radially outwardly of said other end of said body.

6. A hose clamp according to claim 3, wherein said tab on said one end is a first tab and said other end of said body includes a second tab extending radially outwardly of said body, said finger being on said second tab.

7. A hose clamp according to claim 3, wherein said finger is circumferentially aligned with said tab and said tab and said finger include means for snap locking interengagement with one another upon movement of said body from said unexpanded to said expanded condition.

8. A hose clamp according to claim 7, wherein said means for snap locking interengagement includes an edge on said tab and a cam surface on said finger.

9. A hose clamp according to claim 1, wherein each of said opposite ends of said body includes a tab extending radially outwardly thereof, said tabs being circumferentially spaced apart a first distance in said unexpanded condition of said body and a second distance less than said first distance in said expanded condition of said body, one of said tabs providing said keeper, and the end of said body including the other of said tabs further including said catch.

10. A hose clamp according to claim 9, wherein said catch is circumferentially aligned with said one tab, and said one tab and said catch include means for snap locking interengagement with one another upon movement of said body from said unexpanded condition to said expanded condition.

11. A hose clamp according to claim 10, wherein said means for snap locking interengagement includes an edge on said one tab and a cam surface on said catch.

12. A hose clamp comprising a circular clamp body of resilient material having an axis, a central portion, and axially adjacent circumferentially overlapping opposite ends, said central portion having openings therethrough symmetrical with respect to a midpoint thereof and with respect to a centerline in the direction between said ends, said ends being on laterally opposite sides of said centerline, said body having an unexpanded condition and being spreadable against the resiliency of said material to an expanded condition, one of said ends having a keeper thereon, the other of said ends having a catch thereon, said keeper and said catch circumferentially interengaging in said expanded condition of said body to releasably hold said body in said expanded condition, said opposite ends of said body being displaceable relative to one another to disengage said keeper and said catch to release said body, each of said opposite ends of said body including a tab extending radially outwardly thereof, said tabs being circumferentially spaced apart a first distance in said unexpanded condition of said body and a second distance less than said first distance in said expanded condition of said body, one of said tabs providing said keeper, and the end of said body including the other of said tabs further including said catch, said one tab having a tool receiving opening extending circumferentially therethrough and the other of said tabs in said expanded condition of said body having a radially extending edge and an axially extending edge accessible through said opening for a tool to interengage with said opening and selectively with one of said radially and axially extending edges for respectively axially and radially displacing said ends of said body relative to one another to disengage said stop and said catch.

13. A hose clamp according to claim 9, wherein said central portion has an axial dimension and axially opposite outer edges, one of said opposite ends has an axial dimension less than that of the central portion and an axially outer edge coinciding with one of the axially outer edges of said central portion, and the other of said opposite ends has an axial dimension less than that of the central portion and an axially outer edge coinciding with the other of said axially outer edges of said central portion.

14. A hose clamp according to claim 13, wherein said one and said other of said opposite ends have circumferentially extending axially adjacent inner edges.

15. A hose clamp according to claim 14, wherein said one tab is on said one of said opposite ends and extends axially outwardly of the inner edge thereof for said one end and said one tab together to have an axial dimension no greater than that of said body, and said other tab is on said other of said opposite ends and extends axially outwardly of the inner edge thereof for said other end and said other tab together to have an axial dimension no greater than that of said body.

16. A hose clamp according to claim 15, wherein said catch is circumferentially spaced from said other tab toward said central portion of said body.

17. A hose clamp according to claim 16, wherein said catch includes a finger having axially outer and inner sides parallel to the axially outer edge of said other of said opposite ends, a first finger end integral with said other end of said body, and a second finger end spaced from said first end toward said other tab, said second end of said finger being radially offset from said body.

18. A hose clamp according to claim 17, wherein said finger has an outer surface inclined radially outwardly from said first finger end toward said second finger end, and said one tab has an axially extending camming edge radially and circumferentially aligned with said outer surface for sliding interengagement therewith during movement of said body from said unexpanded to said expanded condition, said second finger end circumferentially passing said camming edge for said second finger end and said one tab to interengage and releasably hold said body in said expanded condition.

19. A hose clamp according to claim 18, wherein said axially outer side of said finger is in a plane transverse to said axis and coinciding with said inner edge of said other of said opposite ends.

20. A hose clamp according to claim 16, wherein said catch includes a finger integral with said other end of said body and extending radially outwardly thereof, said finger having a catch surface circumferentially facing said other tab.

21. A hose clamp according to claim 20, wherein said finger has a camming surface extending circumferentially away from said catch surface, and said one tab has an axially extending camming edge radially and circumferentially aligned with said camming surface for sliding interengagement therewith during movement of said body from said unexpanded to said expanded condition, said catch surface circumferentially passing said camming edge for said catch surface and said one tab to interengage and releasably hold said body in said expanded condition.

22. A hose clamp according to claim 21, wherein said finger has axially inner and outer sides, said outer side being in a plane transverse to said axis and coinciding with said inner edge of said other of said opposite ends.

23. A hose clamp according to claim 16, wherein said catch includes a finger integral with said other tab and extending circumferentially toward said one tab, said finger having a catch surface circumferentially facing said other tab.

24. A hose clamp according to claim 23, wherein said finger has a camming surface extending circumferentially away from said catch surface, and said one tab has an axially extending camming edge radially and circumferentially aligned with said camming surface for sliding interengagement therewith during movement of said body from said unexpanded to said expanded condition, said catch surface circumferentially passing said camming edge for said catch surface and said one tab to interengage and releasably hold said body in said expanded condition.

25. A hose clamp according to claim 24, wherein said finger has axially inner and outer sides, said outer side being in a plane transverse to said axis and coinciding with said inner edge of said other of said opposite ends.

26. A spring metal blank for forming a hose clamp, said blank being flat and having an axis, a central portion, a pair of openings through said central portion symmetrical with respect to a midpoint of said central portion and said axis, ends on laterally opposite sides of said axis with respect to one another and extending in axially opposite directions from said central portion, said ends having laterally inner edges adjacent said axis, each said end having a terminus including a tab extending laterally inwardly of the inner edge of the end, and one of said ends having a catch member integral therewith and including a catch surface facing the tab thereon.

27. A spring metal blank for forming a hose clamp, said blank being flat and having an axis, a central portion, a pair of openings through said central portion symmetrical with respect to a midpoint of said central portion and said axis, ends on laterally opposite sides of said axis and extending in axially opposite directions from said central portion, said ends having laterally inner edges adjacent said axis, each said end having a terminus including a tab extending laterally inwardly of the inner edge of the end, and one of said ends having a catch member integral therewith and including a catch surface facing the tab thereon, said catch member being an axially extending finger having a laterally outer side coinciding with the laterally inner edge of said one end and having a laterally inner side laterally spaced from and parallel to said laterally outer side.

28. A blank according to claim 26, wherein said catch member is a finger extending laterally outwardly from the laterally inner edge of said one end.

29. A blank according to claim 28, wherein said finger has a cam surface facing said central portion and inclined relative to the laterally inner edge of said one end.

30. A blank according to claim 26, wherein said catch member is a finger on the tab on said one end, said finger extending laterally outwardly from said tab on said one end.

31. A blank according to claim 30, wherein said finger has a cam surface spaced laterally outwardly from the tab on said one end and inclining laterally toward and axially outwardly of the tab on said one end.

32. A spring metal blank for forming a hose clamp, said blank being flat and having an axis, a central portion, a pair of openings through said central portion symmetrical with respect to a midpoint of said central portion and said axis, ends on laterally opposite sides of said axis and extending in axially opposite directions from said central portion, said ends having laterally inner edges adjacent said axis, each said end having a terminus including a tab extending laterally inwardly of the inner edge of the end, one of said ends having a catch member integral therewith and including a catch surface facing the tab thereon, said central portion having laterally spaced apart outer edges, and each said end having a laterally outer edge coinciding with a different one of said outer edges of said central portion.

33. A blank according to claim 32, wherein said catch member is an axially extending finger having a laterally outer side coinciding with the laterally inner edge of said one end and having a laterally inner side between said laterally inner edge and the outer edge of said one end.

34. A blank according to claim 32, wherein said catch member is a finger extending laterally outwardly from the laterally inner edge of said one end, said finger having a cam surface facing said central portion and inclined relative to the laterally inner edge of said one end.

35. A blank according to claim 32, wherein said catch member is a finger on the tab on said one end, said finger extending laterally outwardly from said tab on said one end and having a cam surface spaced laterally outwardly from said tab on said one end and inclining laterally toward and axially outwardly of said tab on said one end.

36. A method of making a hose clamp comprising the steps of:
  a) producing a blank of resilient material having an axis, a central portion, ends on laterally opposite sides of said axis with respect to one another and extending in axially opposite directions from said central portion, openings through said central portion symmetrical with respect to said axis and with respect to a midpoint of said central portion between said ends, said ends having laterally inner edges adjacent said axis, a stop member on one of said ends and a catch member on the other of said ends; and,
  b) forming said blank to a circular configuration in which said laterally inner edges are axially adjacent and said stop member and said catch member are circumferentially overlapped.

* * * * *